United States Patent
Rawlings et al.

(10) Patent No.: US 8,851,874 B2
(45) Date of Patent: Oct. 7, 2014

(54) MOLD AND METHOD FOR MANUFACTURE THEREOF

(75) Inventors: Jaime J. Rawlings, St. Leamington (CA); Scott Neidig, Baden (CA); Paul R. Norris, Chatham (CA)

(73) Assignee: Proprietect L.P. (CA)

( * ) Notice: Subject to any disclaimer, the term of this patent is extended or adjusted under 35 U.S.C. 154(b) by 638 days.

(21) Appl. No.: 11/421,154

(22) Filed: May 31, 2006

(65) Prior Publication Data
US 2007/0145634 A1   Jun. 28, 2007

Related U.S. Application Data

(60) Provisional application No. 60/685,420, filed on May 31, 2005.

(51) Int. Cl.
*B29C 33/00* (2006.01)
(52) U.S. Cl.
CPC ........... *B29C 33/0038* (2013.01); *Y10S 425/047* (2013.01)
USPC .................................. 425/116; 425/DIG. 47
(58) Field of Classification Search
CPC .................................................... B29C 33/0038
USPC ............ 425/4 R, 116, DIG. 47; 249/117, 170
See application file for complete search history.

(56) References Cited

U.S. PATENT DOCUMENTS

| | | | | | |
|---|---|---|---|---|---|
| 2,734,227 | A | * | 2/1956 | Costick et al. | 425/218 |
| 3,484,510 | A | * | 12/1969 | Corazza | 264/51 |
| 4,688,752 | A | * | 8/1987 | Barteck et al. | 249/85 |
| 5,723,152 | A | * | 3/1998 | Hirata et al. | 425/4 R |
| 6,298,908 | B1 | * | 10/2001 | Harrell et al. | 165/69 |
| 6,491,508 | B1 | * | 12/2002 | Kurosawa et al. | 425/116 |
| 2006/0043626 | A1 | * | 3/2006 | Wu et al. | 264/101 |

OTHER PUBLICATIONS

RL Hudson Handbook, excerpt from O-ring design and materials guide (pp. 1-3), printed Oct. 2011.*
RL Hudson Shore Hardness conversion table, 2002.*

* cited by examiner

*Primary Examiner* — Alison Hindenlang
(74) *Attorney, Agent, or Firm* — Katten Muchin Rosenman LLP

(57) ABSTRACT

There is disclosed a mold comprising a first mold portion and a second mold portion engageable to define a mold cavity in a closed position of the mold. The first mold portion comprises a first part-line surface and the second mold portion comprises a second part-line surface. The first part-line surface comprises a projection portion and the second part-line surface comprising a resilient portion for substantially sealing engagement with the projection portion in the closed position of the mold. The present mold allows for the production of a so-called "positive seal" between the two mold halves at the part-line of the mold, particularly in the areas of the part-line where there is no vent. This allows for production of a molded part having minimal or no flash produced at the part-line of the mold.

47 Claims, 5 Drawing Sheets

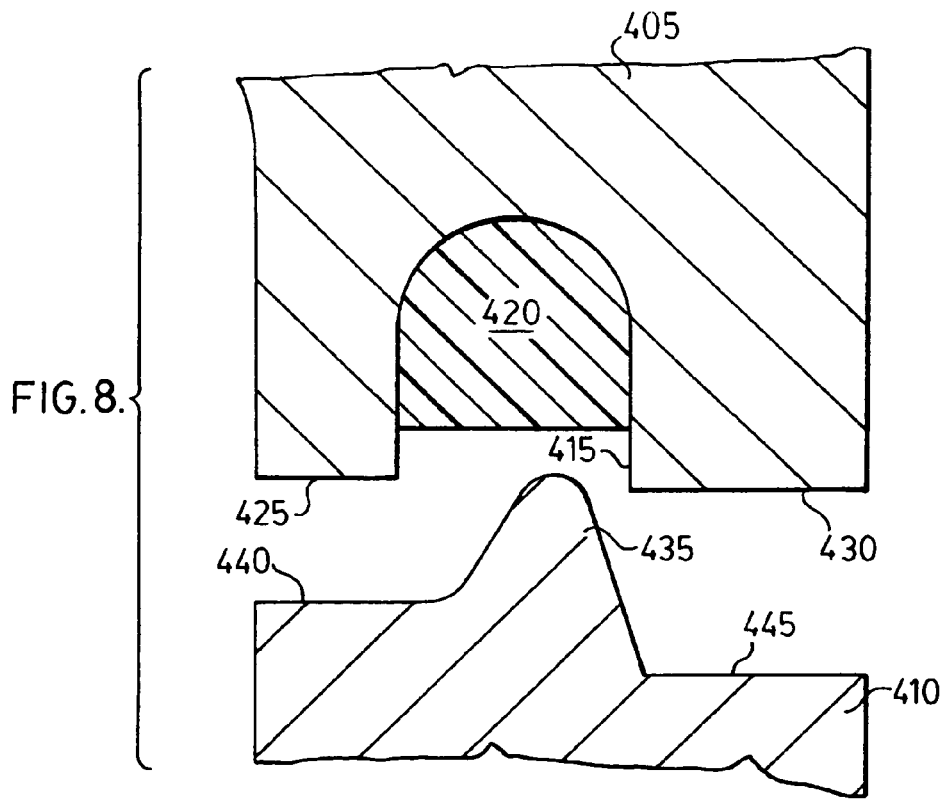
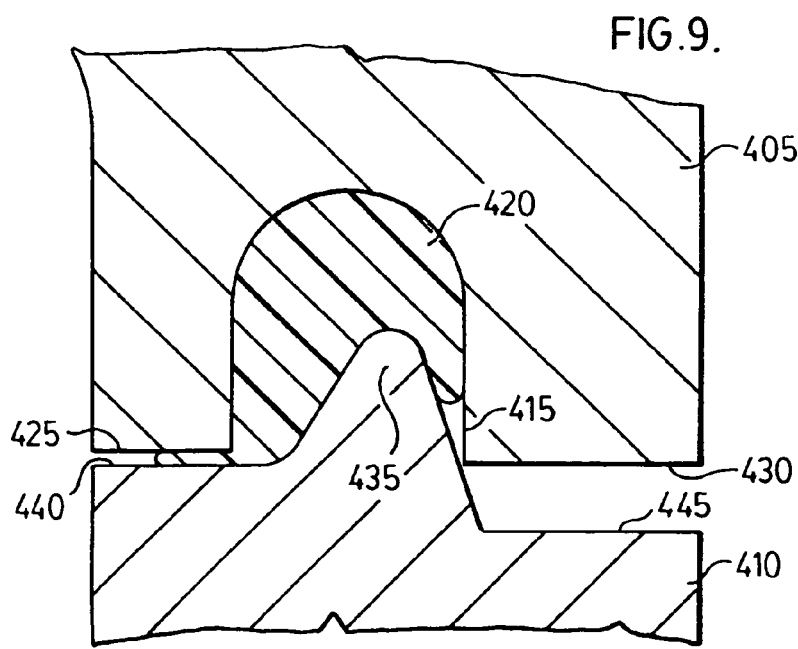

MOLD AND METHOD FOR MANUFACTURE THEREOF

CROSS-REFERENCE TO RELATED APPLICATION

The present application claims the benefit under 35 U.S.C. §119(e) of provisional patent application Ser. No. 60/685,420, filed May 31, 2005, the contents of which are hereby incorporated by reference.

BACKGROUND OF THE INVENTION

1. Field of the Invention

In one of its aspects, the present invention relates to a mold for producing a molded element, preferably a molded foam seat element, more preferably a molded foam vehicular seat element. In yet another of its aspects, the present invention relates to a method for manufacture of a mold.

2. Description of the Prior Art

Many articles are manufactured by placing a raw material into a cavity in a mold wherein the raw material undergoes a physical change (e.g., it expands or foams) and the article produced thus acquires the shape of the cavity. In particular, this technique is commonly employed for producing foamed articles made from polymeric foams such as polyurethane foam, latex (e.g., natural and styrene-butadiene rubber) foam and the like.

For example, automotive seats are commonly manufactured from polyurethane cushions which are molded to shape and then covered with a vinyl, cloth or leather finish cover (also known as a "trim cover"). Polyurethane foams are somewhat unique in that foaming and at least a portion of the polymerization process occur simultaneously. Thus, in the production of polyurethane foam using, for example, a conventional cold foam technique, a typical formulation comprises:

1. polyol (and/or other active hydrogen-containing material);
2. water;
3. catalyst;
4. cross-linking agent; and
5. polyisocyanate.

The mixture is dispensed into a mold using a suitable mixing head, after which the mold is then closed to permit the expanding mass within it to be molded. Accordingly, it is convenient generally to refer to the mixture initially dispensed into the mold as "a liquid foamable polymeric composition" or, in this case, "a liquid foamable polyurethane composition". As the composition expands in the mold, polymerization occurs and the polymer so formed becomes solidified.

When molding a liquid foamable polymeric composition to form articles, such as polyurethane foam articles, it is conventional to use a clam-shell mold comprising a bottom mold (also referred to as a "bowl") and a top mold (also referred to as a "lid") which, when closed, define a mold cavity. In a conventional process, the mold is opened, the liquid foamable polyurethane composition is dispensed into the mold cavity and the mold is closed as a chemical reaction causes the composition to expand. After the mold is closed, the composition expands to fill the interior cavity of the mold. Alternatively, the composition may be dispensed into a closed mold. In either case, as the polymerization reaction is completed, the foam cures and permanently assumes the shape of the mold cavity.

As is known to those of skill in the art, it is important during this process that the mold be adequately vented to allow the air present in the mold to exit the mold as the foamable composition expands. Further, it is important to allow a portion of the gases (typically $CO_2$ in the production of polyurethane) generated during polymerization to exit the mold.

Failure to adequately vent the mold results in defective molded articles exhibiting symptoms of improper foaming such as surface hardening (or foam densification) and/or void formation in the finished article due to trapped gas or air bubbles. At the other extreme, excess venting of the mold will also result in defective molded articles due to collapse of the foam prior to curing; this phenomenon is often referred to as the "soufflé" effect. Thus, proper venting of a mold is an important factor in producing molded articles of acceptable quality.

Typically, first generation clam-shell molds have been designed with drilled or cut passages in the top mold to provide vents. Locating, sizing and deciding upon the number of these vents is a matter of some skill on the part of mold designer and the production engineers, and is often an iterative procedure with more vents being added to various locations or other vents being blocked-off after test runs have been made.

During molding operations some liquid foamable polymeric composition which moves into the vent is wasted. It is generally desired to minimize the amount of wasted material (also known as "flash", "mushrooms", "buds", "pancakes" and the like) for two reasons, namely (1) the wasted material adds to the overall expense of chemicals required to produce the finished article, and (2) the wasted material must be removed from the molded article prior to the finish cover being applied, thereby necessitating additional labour and the costs associated therewith.

In U.S. Pat. No. 5,356,580 (Re.36,413), U.S. Pat. No. 5,482,721 (Re.36,572) and U.S. Pat. No. 5,587,183 [collectively referred to as "the Clark et al. patents"], there is disclosed a second generation mold. The second generation mold taught by the Clark et al. patents included an improved parting line vent (also known in the art as a "ribbon vent"). This improved parting line vent is a highly efficient vent that facilitates the bulk of venting of the mold cavity.

In copending U.S. patent application Ser. No. 10/973,985 [Cathcart et al.], there is taught a third generation mold for producing foam articles. In a preferred embodiment, the mold comprises a lid and a bowl releasingly engageable to define a mold cavity, the lid comprising: (i) a vent having a passageway for gas to escape from the mold cavity, and (ii) a plurality of grooves connected to the vent. The use of a plurality of grooves/slots in the mold cavity surface effectively acts as a siphon to draw gas away from the composition to be molded. The plurality of grooves/slots may be connected to one or more parting line vents which allow for escape of the gas from the mold cavity to the exterior of the mold.

Thus, over the years, there has been much attention devoted to improving venting, particularly parting line or part-line venting in clam-shell molds. The overall goal has been to produce so-called trim-free parts—i.e., parts have no trim or have minimal trim that need not be removed. The advantages of such an approach include a significant reduction in labor and in production material waste.

What has received relatively little attention is the remaining portion of the parting line or part-line—i.e., the portion not containing the vents. Typically, this remaining portion is simply two flat surfaces disposed horizontally or at an angle (e.g., 15°) with respect to the mold cavity. The width of the part line is typically 25 millimeters or more. This can result in the production of uncontrolled flash that requires trimming notwithstanding the fact that vents disposed in the parting line or part-line are designed to avoid the need for trimming. In other words, the advantage of utilizing a vent that is capable of producing so-called trim-free parts can be neutralized by the uncontrolled production of flash material in the areas in the parting line not containing the vents.

Accordingly, there remains a need in the art for an improved mold having a parting line or part-line which obviates or mitigates the production of uncontrolled flash, particularly in areas of the parting line or part-line which do not contain a vent.

It would be particularly advantageous if such an improvement could be implemented without the requirement for large capital expenditure.

SUMMARY OF THE INVENTION

It is an object of the present invention to obviate or mitigate at least one of the above-mentioned disadvantages of the prior art.

Accordingly, in one of its aspects, the present invention provides a mold comprising a first mold portion and a second mold portion engageable to define a mold cavity in a closed position of the mold, the first mold portion comprising a first part-line surface and the second mold portion comprising a second part-line surface, the first part-line surface comprising a projection portion and the second part-line surface comprising a resilient portion for substantially sealing engagement with the projection portion in the closed position of the mold.

In another of its aspects, the present invention relates to a mold comprising a first mold portion and a second mold portion engageable to define a mold cavity in a closed position of the mold, the first mold portion comprising a first part-line surface and the second mold portion comprising a second part-line surface, the first part-line surface and the second part-line surface combining in the closed position of the mold to define a mold part-line having a non-linear path from the mold cavity to an exterior of the mold.

In yet another of its aspects, the present invention relates to mold comprising a first mold portion and a second mold portion reversibly engageable between an open position and a closed position that defines a mold cavity, the first mold portion comprising a first part-line surface and the second mold portion comprising a second part-line surface, the first part-line surface comprising a projection portion and the second part-line surface comprising a receptacle comprising a resilient portion;

wherein: (i) in the open position of the mold, the receptacle comprises a first area occupied by the resilient portion and a second area unoccupied by the resilient portion, and, (ii) in the closed position of the mold, at least a portion of the second area is occupied by the resilient portion.

In yet another of its aspects, the present invention relates to a method for manufacturing mold comprising a first mold portion and a second mold portion engageable to define a mold cavity in a closed position of the mold, the first mold portion comprising a first part-line surface and the second mold portion comprising a second part-line surface, the first part-line surface comprising a projection portion and the second part-line surface comprising a resilient portion, the method comprising the steps of:

(a) disposing a polymer material on the first mold portion;
(b) forming a receptacle portion in the polymer material; and
(c) disposing the resilient portion in the receptacle.

Accordingly, the present inventors have discovered a novel mold which obviates or mitigates the above-mentioned problems associated with the prior art. Specifically, the present mold allows for the production of a so-called "positive seal" between the two mold halves at the part-line of the mold, particularly in the areas of the part-line where there is no vent. This allows for production of a molded part having minimal or no flash produced at the part-line of the mold. If the mold in question contains a part-line vent which is designed to produce thin ribbons that can be folded back, the part can be considered trim-free in that the flash that would be produced is intentionally produced by the part-line vent as opposed to the current approach which produces intentional flash from the part-line vents and uncontrolled/unintentional flash around the periphery of the part-line resulting in an unsightly part which must be subjected to trim removal operations.

The present mold has a number of advantages, including one or more of the following:

the possibility of accumulation of wax, mold release agents and the like in the part-line of the mold is obviated or mitigated;

the possibility of molding material build-up in the part-line is obviated or mitigated;

there is a significant reduction in labour since the resulting part is truly trim-free; and there is a reduction in the amount of scrap produced from "under fill" of the mold.

Of course, those of skill in the art will recognize other advantages accruing from the present seat element based on the present specification.

BRIEF DESCRIPTION OF THE DRAWINGS

Embodiments of the present invention will be described with reference to the accompanying drawings, wherein like reference numerals denote like parts, and in which:

FIGS. 8 and 9 illustrate an enlarge cross-sectional view of the part-line of a fourth embodiment of the present mold.

DETAILED DESCRIPTION OF THE PREFERRED EMBODIMENTS

The present invention relates to a mold. The mold can be used to produce any molded product of interest. Preferably, the present mold is adapted for production of a foam part although this is not necessary.

When the present mold is used to produce a foam part, it is highly advantageous that the foam part be an element used in a vehicle—e.g., a seat element, a head rest, an arm rest, a knee bolster, an instrument panel, any other molded trim panel and the like. As used throughout this specification, the term "seat" is intended to have its conventional meaning and includes one or both of a bottom or cushion (i.e., the portion of the seat on which the occupant sits) and a back or backrest (i.e., the portion of the seat which supports the back of the occupant). As is known in the automotive, airline and related industries, a "seat" includes both a cushion (or bottom) and a back (or backrest). Thus, the term "seat" includes a seat element such as a cushion (or bottom), a back (or backrest) or a unit construction comprising a cushion (or bottom) and a back (or backrest). It should also be mentioned that a seat element may be considered to be a cushion (or bottom), a back (or backrest), a headrest and/or an armrest.

Figure 1:
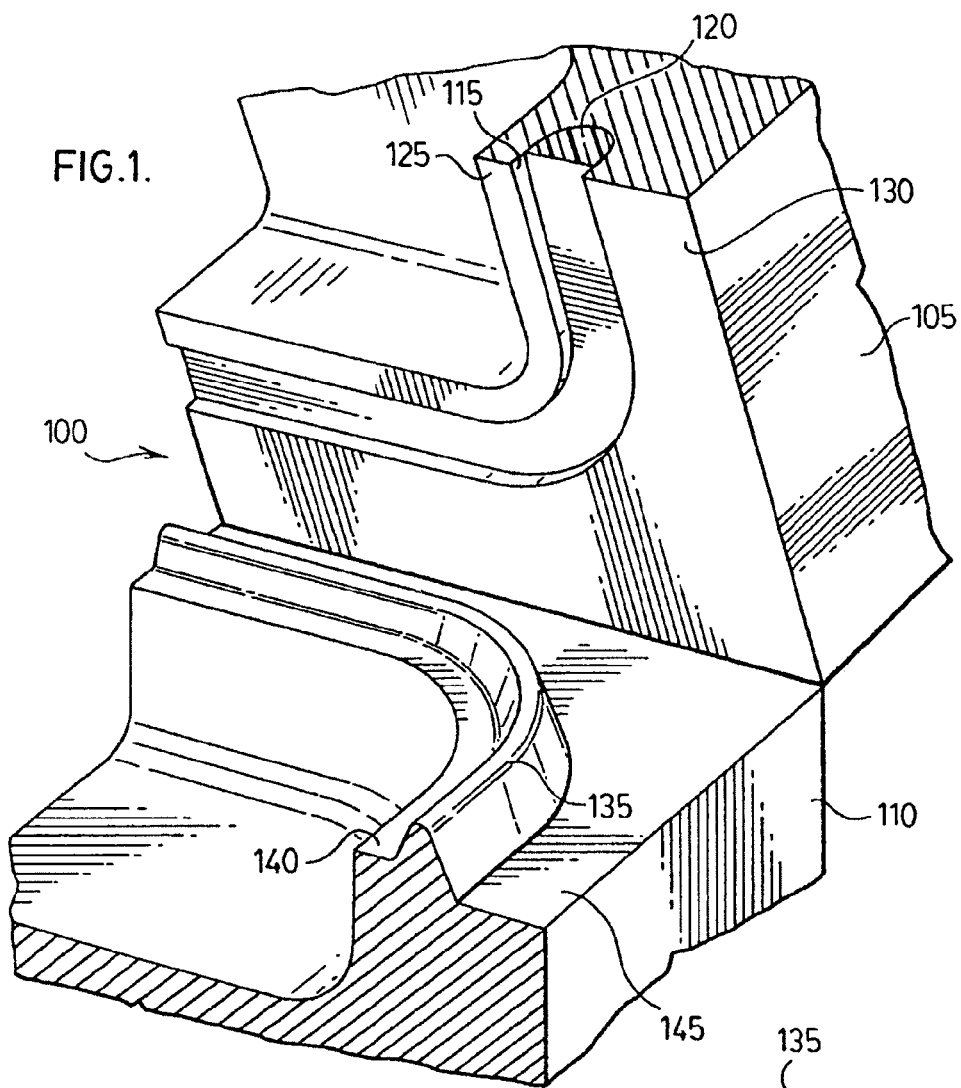
FIG. 1 illustrates a perspective view, partially cutaway, of a preferred embodiment of the present mold.

With reference to FIG. 1, there is illustrated a mold 100 comprising a lid 105 and a bowl 110.

Figure 2:
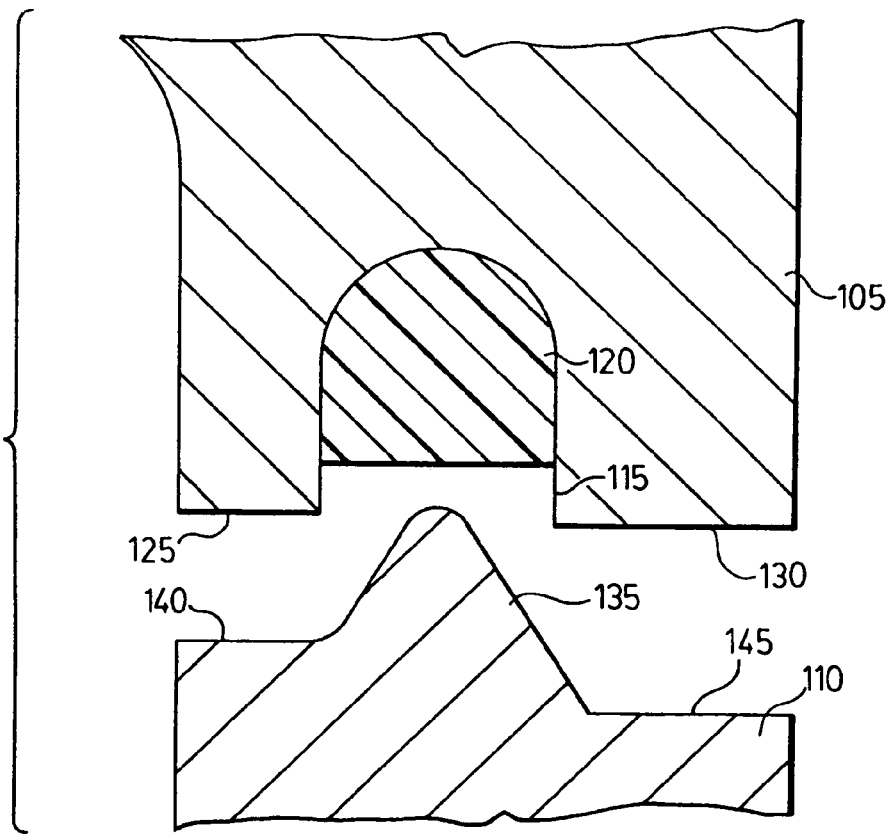
FIGS. 2 and 3 illustrate an enlarged cross-sectional view of the part-line of the mold illustrated in FIG. 1.
Figure 3:
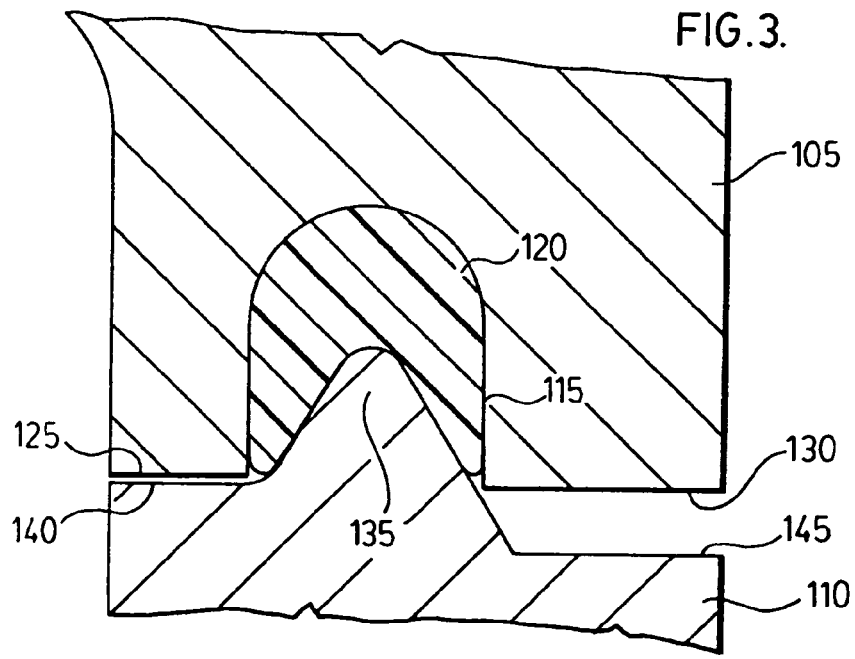

Lid 105 and bowl 110 are reversibly engageable between an open position (FIGS. 1 and 2) and a closed position (FIG. 3).

Lid 105 comprises a receptacle 115. Receptacle 115 contains a resilient material 120 which occupies a portion of receptacle 115. As shown, receptacle 115 is interposed in between a pair of flat surfaces 125,130. As further shown, receptacle 115 has the profile of an inverted U. Of course, those with skill in the art will recognize that different profiles (e.g., rectilinear, curvilinear and the like) may be used in place of the U-shaped profile shown in FIGS. 1-3.

In the embodiment illustrated in FIGS. 1-3, receptacle 1 and 5 is machined into the material from which lid 105 is constructed (e.g., aluminum).

Bowl 110 comprises a projection 135 interposed between a pair of flat surfaces 140,145.

Preferably, projection 135 is machined from the material from which bowl 110 is made (e.g., aluminum).

When it is desired to produce a molded part, the molding material (e.g., a liquid polyurethane foamable composition) is dispensed in bowl 110 when mold 100 is the open position. There after, lid 105 is swung into the closed position thereby resulting in the configuration in FIG. 3. As shown, projection 135 of bowl 110 is urged into resilient material 120 which causes resilient material 120 to be urged toward the edges of flat surfaces 125,135. This, in effect, creates a positive seal between lid 105 and bowl 110. That is much more reliable than a hard surface to hard surface seal. Preferably, the width of flat surfaces 125,140 is minimal thereby resulting in little or no flash material being formed from molding material entering the space between surfaces 125,140. For example, the width of flat surfaces 125,140 is less than 5 mm, more preferably less than 4 mm, more preferably less than 3 mm, more preferably 2 mm or less.

With regard to the remaining embodiments of the present mold, reference will be made to subsequent figures using the same last two digits of reference numeral used to describe the embodiment illustrated in FIGS. 1-3. For example, projection 135 in the embodiment of the present mold shown in FIGS. 1-3 is equivalent to projection 235 in the embodiment illustrated in FIGS. 4-5, etc.

Figure 4:
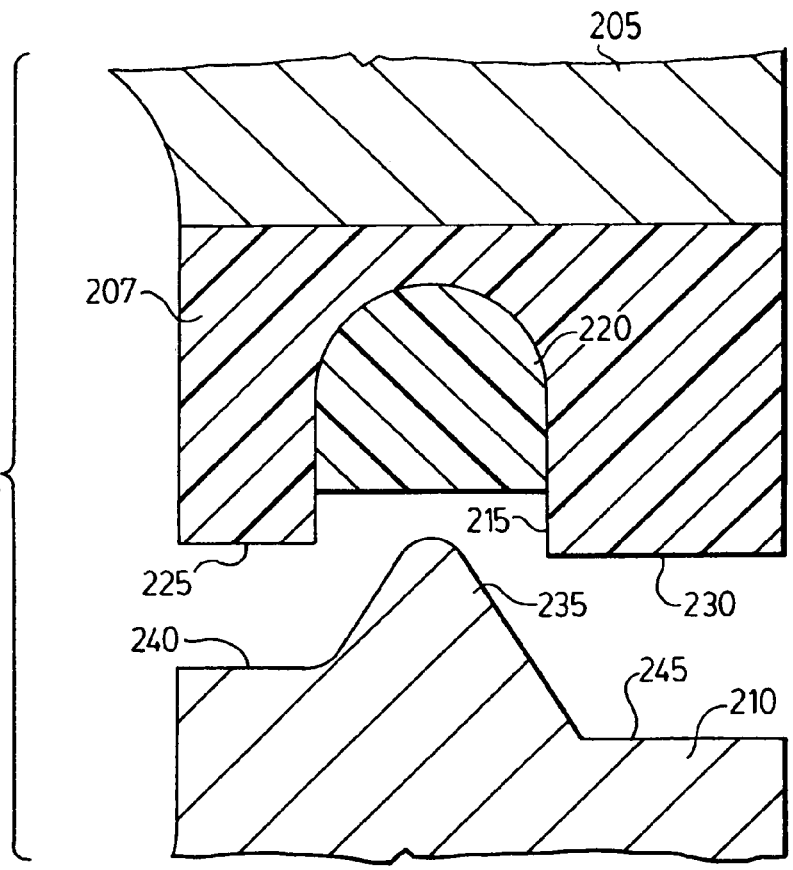
FIGS. 4 and 5 illustrate an enlarge cross-sectional view of the part-line of a second embodiment of the present mold.
Figure 5:
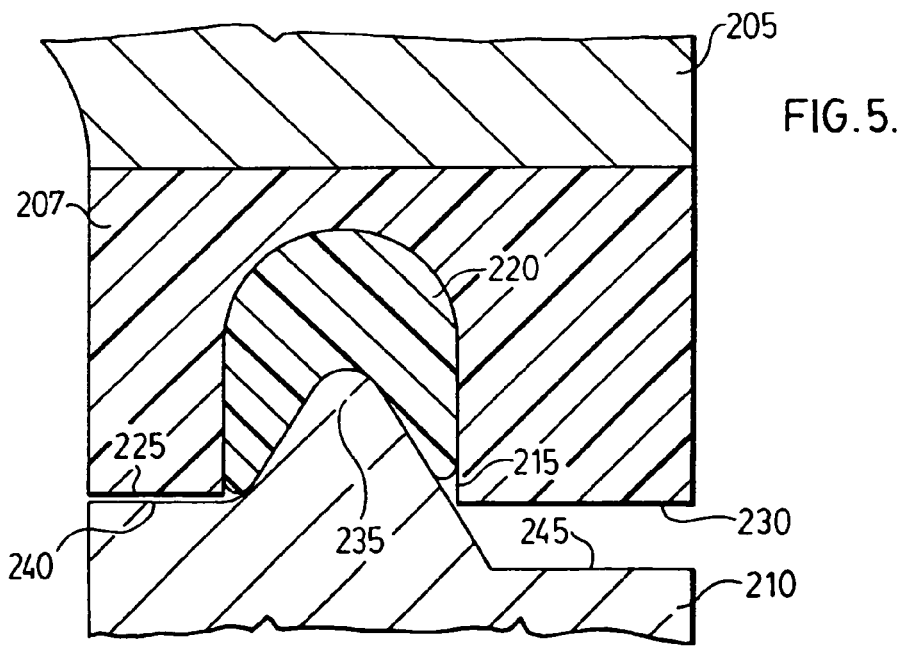

Thus, with reference to the embodiment illustrated in FIGS. 4-5, receptacle 215 is formed in an epoxy material 207 which is adhered to lid 205.

Figure 6:
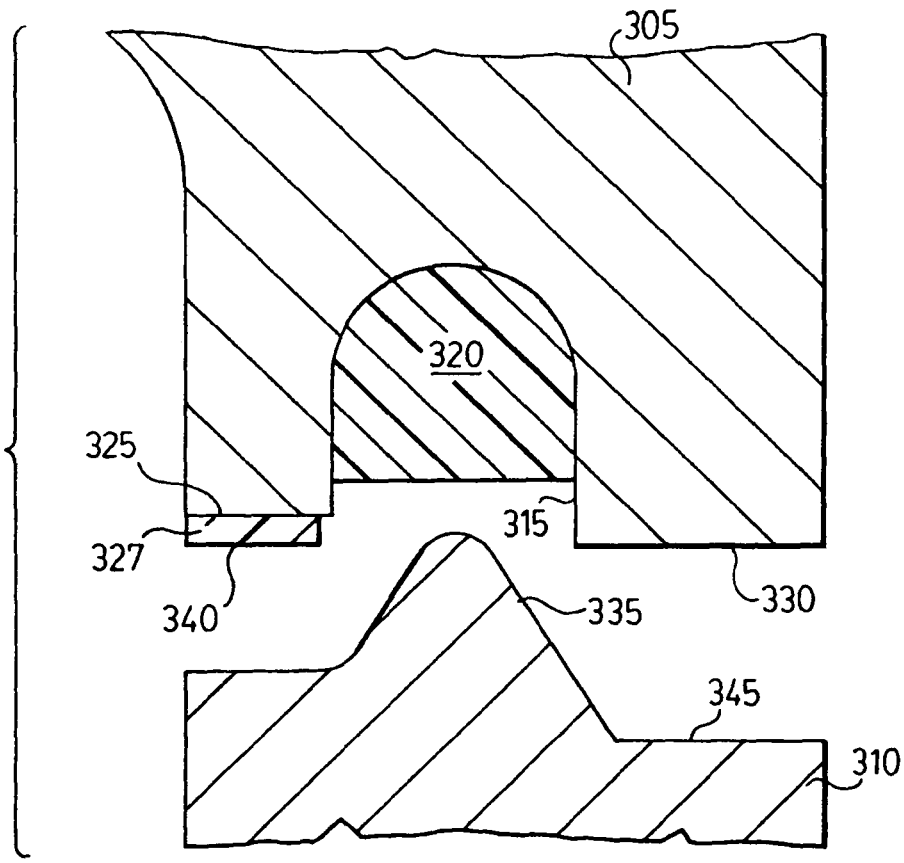
FIGS. 6 and 7 illustrate an enlarge cross-sectional view of the part-line of a third embodiment of the present mold.
Figure 7:
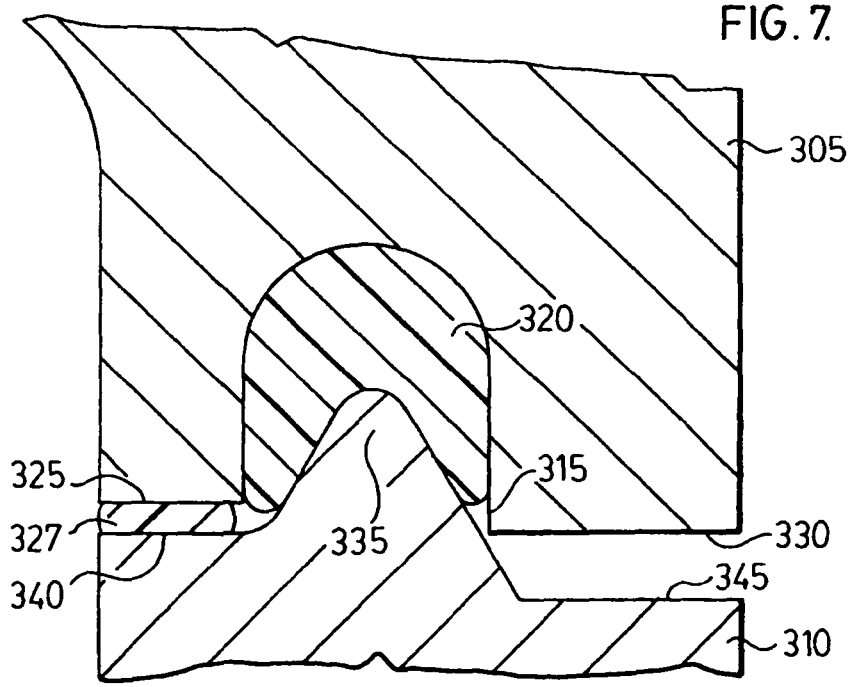

With reference to the embodiment illustrated FIGS. 6 and 7, the mold is similar to the one illustrated in FIG. 1 with the exception that flat surface 325 has been modified to include a sealing element 327. Sealing element 327 can be made from an epoxy resin or similar material that will provide an improved seal as compared to making flat aluminum surfaces as shown in FIG. 1. Preferably, sealing element 325 is less resilient than resilient material 320.

With reference to the embodiment of the present mold illustrated in FIGS. 8 and 9, it will be sent that the apex of receptacle 415 is offset with respect to the apex of projection 435. As shown, particularly with reference to FIG. 9, this allows for resilient material 420 to enter into and partially fill the space between flat surfaces 425,440. While FIG. 9 shows this space to be partially filled by resilient material 420, it is possible to substantially completely fill this spacing with resilient material 420 thereby blocking molding material from entering into the spacing between flat surfaces 125,140.

Figure 10:
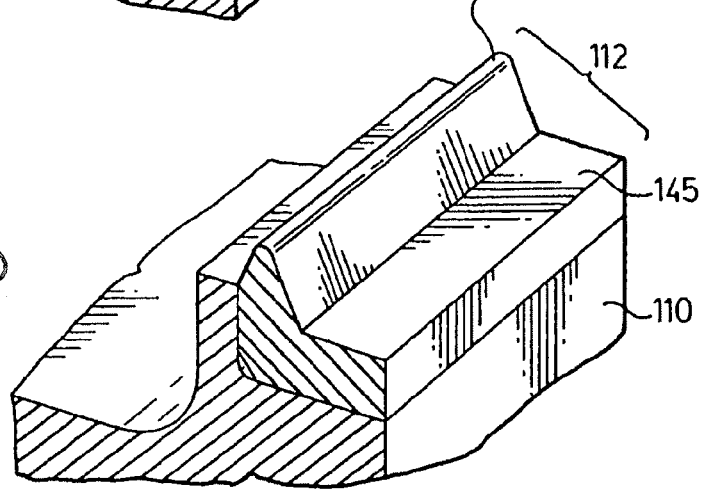
FIG. 10 illustrates an alternate embodiment of the bowl of the mold illustrated in FIG. 1.

With reference to FIG. 10, there is illustrated a modified form of bowl 110 shown in FIGS. 1-3. Specifically, instead of machining projection 135 into the material from which bowl 110 is constructed, a block 112 is independently produced from any suitable material (e.g., epoxy resin, other polymer material, metal and the like) and affixed to bowl 110. Block 112 includes projection 135 and flat surface 145 such an arrangement is particularly useful when it is desired to retrofit an existing mold to provide the positive seal of the present mold.

The resilient material used in the present mold is not particularly restricted provided that, when combined with the projection, the resilient material can be urged to form a "positive seal" as described above.

Preferably, the resilient material has a Shore D hardness of less than 30 as measured by ASTM 2240, more preferably in the range from about 10 to about 15 as measured by ASTM 224.

Preferably, the resilient material comprises a polymer, more preferably a silicone containing polymer or other silicone-containing material. The compositional nature of the material is not particularly restricted provided that the material can withstand the conditions (e.g., temperature, and the like) under which the mold is used and is not reactive with the molding materials (including moldering stages and the like) used in the molding process.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments. Further, all of the claims are hereby incorporated by reference into the description of the preferred embodiments.

All publications, patents and patent applications referred to herein are incorporated by reference in their entirety to the same extent as if each individual publication, patent or patent application was specifically and individually indicated to be incorporated by reference in its entirety.

What is claimed is:

1. A mold comprising:
    a first mold portion and a second mold portion engageable to define a mold cavity in a closed position of the mold, the first mold portion comprising a first part-line surface and the second mold portion comprising a second part-line surface,
    the first part-line surface comprising a projection portion and the second part-line surface comprising a receptacle with a resilient portion therein, the resilient portion having a non-arched surface for substantially sealing engagement with the projection portion in the closed position of the mold,
    the projection portion configured to (i) extend below the surface of the second part-line surface in the closed position of the mold, and (ii) depress into the non-arched surface of the resilient portion in the closed position of the mold to cause the resilient portion to extend to the second part-line surface, but not to enter the mold cavity, the projecting portion having a wedge shape with an apex that is narrower than a width of the non-arched surface of the resilient portion.

2. The mold defined in claim 1, wherein the first mold portion comprises a bowl and the second mold portion comprises a lid.

3. The mold defined in claim 1, wherein the first mold portion comprises a lid and the second mold portion comprises a bowl.

4. The mold defined in claim 3, wherein the resilient portion comprises a material having a Shore D hardness of <30 as measured by ASTM 2240.

5. The mold defined in claim 3, wherein the resilient portion comprises a material having a Shore D hardness in the range of from about 10 to about 15 as measured by ASTM 2240.

6. The mold defined in claim 5, wherein the resilient portion is disposed so as to be below the second part-line surface.

7. The mold defined in claim 6, wherein the resilient portion occupies less than all of the receptacle.

8. The mold defined in claim 7, wherein the receptacle and the projection portion have different profiles.

9. The mold defined in claim 7, wherein the receptacle and the projection portion have substantially the same profile.

10. The mold defined in claim 9, wherein the receptacle comprises a U-shape.

11. The mold defined in claim 10, wherein the receptacle is interposed between a first flat portion and a second flat portion located on the second part-line surface.

12. The mold defined in claim 10, wherein the projection portion is interposed between a third flat portion and a fourth flat portion located on the first part-line surface.

13. The mold defined in claim 10, wherein the receptacle is interposed between a first flat portion and a second flat portion, and the projection portion is interposed between a third flat portion and a fourth flat portion.

14. The mold defined in claim 13, wherein the first flat portion and the third flat portion are interposed between the mold cavity and the receptacle.

15. The mold defined in claim 14, wherein a seal member is disposed between the first flat portion and the second flat portion.

16. The mold defined in claim 14, wherein a seal member is disposed on the first flat portion.

17. The mold defined in claim 14, wherein a seal member is disposed on the second flat portion.

18. The mold defined in claim 17, wherein the seal comprises a polymer material.

19. The mold defined in claim 17, wherein the seal comprises an epoxy polymer material.

20. The mold defined in claim 19, wherein the first flat portion and the second flat portion are aligned with respect to one another.

21. The mold defined in claim 19, wherein the first flat portion and the second flat portion are offset with respect to one another.

22. The mold defined in claim 19, wherein the third flat portion and the fourth flat portion are aligned with respect to one another.

23. The mold defined in claim 19, wherein the third flat portion and the fourth flat portion are offset with respect to one another.

24. The mold defined in claim 19, wherein the first flat portion and the second flat portion are offset with respect to one another, and the third flat portion and the fourth flat portion are offset with respect to one another.

25. The mold defined in claim 24, wherein the projection portion comprises a first apex and the receptacle comprises a second apex.

26. The mold defined in claim 25, wherein the projection portion is substantially symmetrical about a first axis passing through the first apex.

27. The mold defined in claim 25, wherein the resilient portion is substantially symmetrical about a second axis passing through the second apex.

28. The mold defined in claim 25, wherein the projection portion is substantially symmetrical about a first axis passing through the first apex, and the resilient portion is substantially symmetrical about a second axis passing through the second apex.

29. The mold defined in claim 28, wherein the first axis and second axis are coterminous.

30. The mold defined in claim 28, wherein the first axis and second axis are non-coterminous.

31. The mold defined in claim 25, wherein the first apex and the second apex are aligned substantially along a line orthogonal to a plane containing the first part-line surface.

32. The mold defined in claim 25, wherein the first apex and the second apex are aligned substantially along a line non-orthogonal to a plane containing the first part-line surface.

33. The mold defined in claim 32, wherein the resilient portion comprises a polymer.

34. The mold defined in claim 32, wherein the resilient portion comprises a silicon-containing material.

35. The mold defined in claim 32, wherein the resilient portion comprises a silicon-containing polymer.

36. The mold defined in claim 1, wherein, the first part-line surface and the second part-line surface combine in the closed position of the mold to define a mold part-line having a non-linear path from the mold cavity to an exterior of the mold.

37. The mold defined in claim 1, wherein the resilient portion has a substantially planar surface portion for substantially sealing engagement with the projection portion in the closed position of the mold.

38. The mold defined in claim 1, wherein the projecting portion has a non-flat engagement apex.

39. The mold defined in claim 1, wherein the resilient portion has an arched surface on a non-engagement side.

40. The mold defined in claim 1, wherein, in the closed position of the mold, the resilient portion does not extend above the surface of the second part-line.

41. The mold defined in claim 1, wherein the projecting portion wedge shape has a base portion substantially as wide as the a width of the non-arched surface of the resilient portion.

42. A mold comprising:
  a first mold portion and a second mold portion reversibly engageable between an open position and a closed position that defines a mold cavity, the first mold portion comprising a first part-line surface and the second mold portion comprising a second part-line surface,
  the first part-line surface comprising a projection portion and the second part-line surface comprising a receptacle having a resilient portion therein, the resilient portion comprising a non-arched surface;
  wherein: (i) in the open position of the mold, the receptacle comprises a first area occupied by the resilient portion and a second area unoccupied by the resilient portion adjacent the second part-line surface, (ii) in the closed position of the mold, at least a portion of the second area is occupied by the resilient portion, and (iii) in the closed position of the mold, the resilient portion extends to the surface of the second part-line, but does not enter the mold cavity, wherein the projecting portion has a wedge shape with an apex that is narrower than a width of the non-arched surface of the resilient portion.

43. The mold defined in claim 42, wherein the resilient portion has a substantially planar surface portion for substantially sealing engagement with the projection portion in the closed position of the mold.

44. The mold defined in claim 42, wherein the projecting portion has a non-flat engagement apex.

45. The mold defined in claim 42, wherein the resilient portion has an arched surface on a non-engagement side.

46. The mold defined in claim 42, wherein, in the closed position of the mold, the resilient portion does not extend above the surface of the second part-line.

47. The mold defined in claim 42, wherein the projecting portion wedge shape has a base portion substantially as wide as the a width of the non-arched surface of the resilient portion.

* * * * *